United States Patent Office 3,592,913
Patented July 13, 1971

3,592,913
FUNGICIDAL METHOD AND COMPOSITIONS THEREFOR COMPRISING 2,3,4,5,6 - PENTA-CHLOROBENZYLIDENE-ANILINE DERIVATIVES
Akira Fujinami, Takarazuka-shi, Katsuji Nodera, Nishinomiya-shi, Toshiaki Ozaki and Sigeo Yamamoto, Toyonaka-shi, and Yoshihiko Nishizawa, Nara-shi, Japan, assignors to Sumitomo Chemical Company, Ltd., Osaka, Japan
No Drawing. Filed May 16, 1968, Ser. No. 729,553
Claims priority, application Japan, May 31, 1967, 42/35,057; Aug. 4, 1967, 42/50,032
Int. Cl. A01n 9/20
U.S. Cl. 424—304         6 Claims

ABSTRACT OF THE DISCLOSURE

Novel compounds represented by the formula,

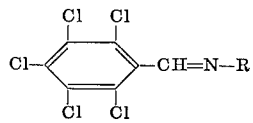

wherein R represents a cyano-substituted lower alkyl, lower alkoxycarbonyl-substituted lower alkyl or phenyl substituted by nitro group, lower alkoxy group or lower alkoxycarbonyl group.

Said compounds are produced by reacting pentachlorobenzaldehyde with an amine of the formula:

wherein R is as above, in an inert solvent. These compounds have strong fungicidal activities and are extremely low in toxicity to men and beasts as well as in phyto-toxicity to crops.

---

The present invention relates to novel 2,3,4,5,6-pentachlorobenzylideneaniline derivatives represented by the formula,

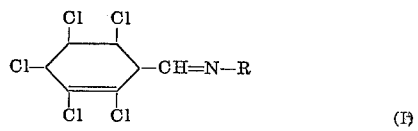

wherein R represents a cyano-substituted lower alkyl, lower alkoxycarbonyl-substitutel lower alkyl or phenyl substituted by nitro group, lower alkoxy group or lower alkoxycarbonyl group and a process for producing the same and further relates to agricultural fungicidal composition containing said derivatives as active ingredients.

Rice planting is one of the agricultures of largest scale, and damages of said crops by plant diseases have a great influence on the yield of rice. Among these plant diseases, there are still some to which no effective chemical agents in exterminating the same have hitherto been found. Even conventional chemical agents being presently used therefor still involve such various problems as strong toxicity to men and beasts, extreme danger in handling the same or phyto-toxicity to the crops.

As agricultural fungicides, there have heretofore been used compounds which contain extremely injurious elements to the human body such as organic mercury compounds or organic arsenic compounds. This has been criticized as an important matter of concern by not only those engaged in the field of agriculture but also general consumers of rice. Under these circumstances, there has been sought fungicides which do not contain injurious elements and yet are low in toxicity to mammals as well as in phyto-toxicity to crops.

Extensive studies by the present inventors for obtaining fungicidal compounds which are excellent in efficacy and also can be put in practical use without any anxiety, have resulted in the finding that novel 2,3,4,5,6-pentachlorobenbylideneaniline derivatives exhibit strong fungicidal activity. These compounds are stable and are capable of protecting crops for a long period of time without causing any injurious action to the crops.

Such fungicidal activity and stability of the 2,3,4,5,6-penta-chlorobenzylideneaniline compounds are characteristics of useful and valuable agricultural fungicides, which have been found by the present inventors for the first time. Further, these compounds have a great advantage of being safely handled, because they do not contain injurious heavy metals such as mercury agents.

Furthermore, these compounds display distinguished preventive effect, particularly against rice blast.

Accordingly, one of the objects of the present invention is to provide novel agricultural fungicidal compounds in compliance with such demand as mentioned above.

Another object of the present invention is to provide a process for producing novel fungicidal compounds.

A further object of the present invention is to provide novel compositions of agricultural fungicides.

These and other objects of the present invention will become apparent to those skilled in the art from a consideration of the following detailed description of the specification and claims.

In order to accomplish these objects, the present invention provides 2,3,4,5,6-pentachlorobenzylidene-aniline derivatives represented by the formula,

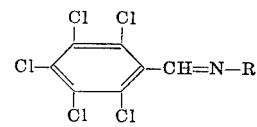

wherein R represent sa cyano-substituted lower alkyl, lower alkoxycarbonyl-substituted lower alkyl or phenyl substituted by nitro group, lower alkoxy group or lower alkoxycarbonyl group.

Further the present invention provides a process for producing 2,3,4,5,6-pentachlorobenzylideneaniline derivatives having the formula:

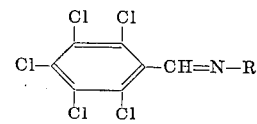

wherein R represents a cyano-substituted lower alkyl, lower alkoxycarbonyl substituted lower alkyl or phenyl substituted by nitro group, lower alkoxy group or lower alkoxycarbonyl group, which comprises reacting pentachlorobenzaldehyde with an amine having the formula:

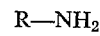

wherein R is as above.

Furthermore the present invention provides a fungicidal composition comprising an inert carrier and an effective amount of one or more kinds of the compound having the formula:

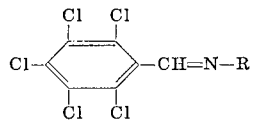

wherein R represents a cyano-substituted lower alkyl, lower alkoxycarbonyl-substituted lower alkyl or phenyl substituted by nitro group, lower alkoxy group or lower alkoxycarbonyl group as the active ingredient.

The compounds of the present invention can generally be obtained by reacting, preferably in the presence of an inert solvent, pentachlorobenzaldehyde with an amine represented by the formula, $$R—NH_2 \qquad (II)$$

wherein R has the same meaning as defined above.

Typical examples of the amines represented by the general Formula II which may be used in the present invention are those enumerated below, but it is natural that the scope of the present invention is not limited to these compounds.

2-nitroaniline, 3-nitroaniline, 4-nitroaniline, 2-methoxyaniline, 3-methoxyaniline, 4-methoxyaniline, 2-ethoxyaniline, 3-ethoxyaniline, 4-ethoxyaniline, 2-propoxyaniline, 4-propoxyaniline, methyl 2-aminobenzoate, methyl 3-aminobenzoate, methyl 4-aminobenzoate, ethyl 2-aminobenzoate, ethyl 3-aminobenzoate, ethyl 4-aminobenzoate, propyl 3-aminobenzoate, 2-cyanoethylamine, 3-cyanopropylamine, 2-cyanopropylamine, methyl aminoacetate, ethyl aminoacetate, propyl aminoacetate, methyl 3-aminopropionate, ethyl 3-aminopropionate and ethyl 4-aminobutyrate.

The reaction is carried out preferably in the presence of an inert solvent such as benzene, toluene, chloroform or n-hexane at a temperature of from room temperature to the boiling point of the solvent used. After the reaction is over, in case a solvent is used, the objective product is separated from the reaction mixture by filtering the reaction mixture or distilling off the solvent. The thus obtained crude product is, if necessary, purified by, for example recrystallization from an appropriate solvent. Yield of the product is almost quantitative.

2,3,4,5,6-pentachlorobenzylideneaniline derivatives obtained according to the present invention are considered to include two kinds of geometrical isomers, but it is natural that any of the isomers represented by the flat constitutional formula expressed by the general Formula I is included in the scope of the present invention.

2,3,4,5,6-pentachlorobenzylideneaniline derivatives obtained in accordance with the present invention are all novel compounds which are very useful as agricultural fungicides.

At the time of putting the compounds of the present invention in practical application, it is even possible to use the same in an unadulterated form without adding other components thereto. For the purpose of easier handling thereof as agricultural fungicides, it can be used by admixing with appropriate carriers. Such mixed agents can take any of the forms being usually employed as agricultural and horticultural fungicides, for example, such as dust, wettable powder, emulsion, granule and the like. At the time of using the mixed agents in such a manner as above, not only can be expected an increase in the effect thereof and security of efficacy thereof but also, it may be possible to use said mixed agents by admixing with other agricultural chemicals such as fungicides, insecticides, herbicides and the like or fertilizers.

The following compounds illustrated below are those as may be in accord with the object of the present invention, but it should be noted that the present invention is not limited only to these compounds.

(1) 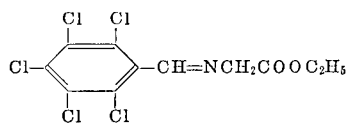

(2) 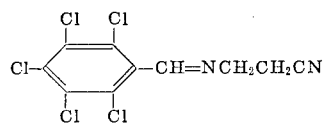

(3) 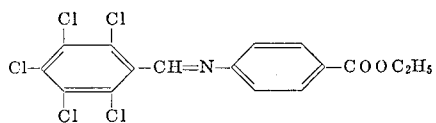

(4) 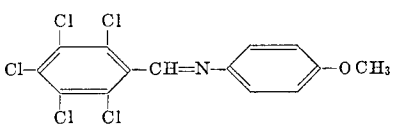

(5) 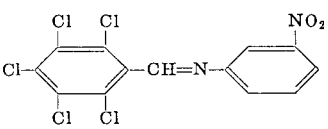

By utilizing the present compounds, there can be obtained at least the addition effect of prevention and curing when antibiotics having strong therapeutic effect such as Blasticidin S, Kasugamycin and the like, or compounds having strong therapeutic effect such as O,O-diethyl-S-benzylphosphorothioate, O-ethyl-S,S-diphenylphosphorodithiolate and the like, are admixed therewith. In such case, prevention and exemption of rice blast can more securely be carried out, compared with the case of employing said individual compounds alone. Besides the above recipe, it is possible to use the present compounds by admixing them with other fungicides such as organic arsenic compounds. Furthermore, with the purpose of simultaneous control of two or more kinds of injurious insects and diseases, it is also possible to use the present compounds by admixing them with insecticides such as γ-1,2,3,4,5,6-hexachlorocyclohexane,
O,O-dimethyl-O-(p-nitrophenyl)-phosphorothioate,
S-[1,2-bis(ethoxycarbonyl)ethyl]-O,O-dimethyl phosphorodithioate,
O,O-dimethyl-S-(N-methyl carbamoylmethyl)phosphorodithioate,
O-ethyl-O-(p-nitrophenyl)-phenyl phosphonothioate,
O,O-dimethyl-O-(p-nitro-m-methylphenyl)phosphorothioate,
O,O-diethyl-O-(2-isopropyl-6-methyl-4-pyrimidinyl) thiophosphate,
α-naphthyl N-methylcarbamate,
3,4-dimethylphenyl N-methylcarbamate and the like, or further blending therewith the aforesaid fungicides.

The following are the results of typical experiments carried out for the purpose of determining the effects and advantages of the present invention.

TEST ON RICE BLAST

Solutions of a given concentration of the individual chemical agents were sprayed onto rice plants (Variety: Waseasahi) at a 3-4 leaves stage cultivated in flower pots of 9 cm. in diameter, the sprayed amount being 7 ml./pot. One day after the spraying, the spore suspension of *Pyricularia oryzae* cultivated were inoculated thereon by spraying, and 4 days after the inoculation, the number of spots generated thereon were counted to determine fungicidal effects of the individual chemical agents, giving the results as shown in Table 1. The values of prevention shown in Table 1 are those corresponding to the numerical values calculated on the basis of the following equation.

Value of prevention = $\dfrac{\text{numbers of spots counted in untreated plot} - \text{numbers of spots counted in treated plot}}{\text{numbers of spots counted in untreated plot}} \times 100$ The names of the present compounds are given in the respective designation numbers of said compounds as enumerated above.

Example 1

One mol of pentachlorobenzaldehyde was dissolved in benzene, the benzene being present in an amount 10 times that of the pentachlorobenzaldehyde, to prepare a solution. One mol of an amine was dissolved in benzene, the benzene being present in an amount 10 times that of the amine, to prepare a solution while being stirred. To the former solution, was gradually added the later solution while being stirred. The resultant mixed solution was refluxed on heating for 30 minutes. After completion of the reaction, the objective 2,3,4,5,6-pentachlorobenzylideneaniline derivative was obtained in a pure state as well as in good yield.

TABLE 1

| Compounds | Concentration of active ingredient (p.p.m.) | Numbers of disease spot per leaf | Value of prevention |
|---|---|---|---|
| (1) | 200 | 1.4 | 96.3 |
| (2) | 200 | 2.2 | 94.1 |
| (3) | 200 | 0.9 | 97.7 |
| (4) | 200 | 2.8 | 92.5 |
| (5) | 200 | 2.3 | 93.8 |
| Phenyl mercuric acetate | 30 | 2.4 | 93.6 |
|  | 15 | 10.8 | 70.0 |
| Untreated | | 37.0 | |

The present invention will be illustrated by the following examples, without, however, being limited thereto.

2,3,4,5,6-pentachlorobenzylideneamine derivative obtained

| Experiment No. | Aldehyde employed | Amines employed | Formula | Physical constant, M.P. °C. | Yield, percent | Elementary analysis, percent ||||||||
|---|---|---|---|---|---|---|---|---|---|---|---|---|---|
| | | | | | | Calc'd |||| Found ||||
| | | | | | | C | H | N | Cl | C | H | N | Cl |
| 1 | 2,3,4,5,6-pentachlorobenzaldehyde | Ethyl aminoacetate |  | 123–123.5 | 95 | 36.35 | 2.22 | 3.85 | 48.77 | 35.97 | 2.10 | 3.93 | 48.64 |
| 2 | do | 2-cyanoethylamine | 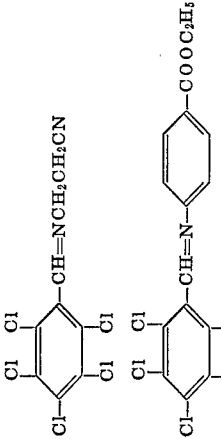 | 117–119 | 98 | 36.35 | 1.53 | 8.48 | 53.65 | 36.42 | 1.49 | 8.34 | 53.52 |
| 3 | do | Ethyl 4-aminobenzoate | 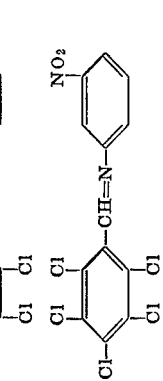 | 160–162 | 96 | 45.16 | 23.7 | 3.29 | 41.66 | 45.37 | 2.40 | 3.45 | 41.82 |
| 4 | do | 4-methoxyaniline | 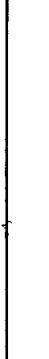 | 158–159.5 | 96 | 43.85 | 2.10 | 3.65 | 46.23 | 43.97 | 2.03 | 3.75 | 46.21 |
| 5 | do | 3-nitroaniline |  | 180 | 92 | 39.18 | 1.26 | 7.03 | 44.49 | 39.46 | 1.32 | 7.17 | 44.38 |

Example 2

5 parts of the compound (Experiment No. 3), 5 parts of an emulsifier (polyoxyethylene alkyl phenol ether type) and 90 parts of xylene were mixed together to obtain an emulsifiable concentrate having an active ingredient concentration of 5%. In application, the emulsifiable concentrate was diluted with water and sprayed.

Example 3

50 parts of the compound (Experiment No. 5), 5 parts of a wetting agent (alkylbenzenesulfonic acid salt type), and 45 parts of diatomite were thoroughly pulverized and mixed with one another to obtain a wettable powder containing 50% of active ingredient. At the time of practical use, said wettable powder was diluted with water to spray.

Example 4

3 parts of the compound (Experiment No. 1) and 97 parts of clay were thoroughly pulverized and mixed together to obtain a dust agent containing 3% of active ingredient. At the time of practical use, said dust agent is dusted as it is.

Example 5

4 parts of the compound (Experiment No. 2) and 96 parts of clay-talc mixture were thoroughly pulverized and mixed together to prepare a dust agent containing 4% of active ingredient. In practical application, said powder agent is dusted as it is.

What is claimed is:

1. A fungicidal composition comprising an agriculturally acceptable carrier and a fungicidally effective amount of a compound having the formula,

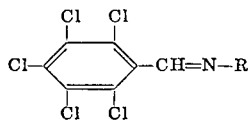

wherein R represents a cyano-substituted lower alkyl having 2 to 3 carbon atoms selected from the group consisting of 2-cyanoethyl, 3-cyanopropyl and 2-cyanopropyl, nitrophenyl, lower alkoxycarbonyl-substituted lower alkyl, lower alkoxyphenyl or lower alkoxy-carbonylphenyl wherein each lower alkyl and lower alkoxy has 1 to 3 carbon atoms.

2. A fungicidal composition according to claim 1, wherein the cyano-substituted lower alkyl is 2-cyanoethyl.

3. A fungicidal composition according to claim 1, wherein the lower alkoxycarbonyl-substituted lower alkyl is ethoxycarbonylmethyl.

4. A fungicidal composition according to claim 1, wherein the lower alkoxyphenyl is p-methoxyphenyl.

5. A fungicidal composition according to claim 1, wherein the lower alkoxy-carbonylphenyl is p-ethoxycarbonylphenyl.

6. A method for controlling fungi, which comprises contacting the fungi with a fungicidally effective amount of the composition of claim 1.

References Cited

UNITED STATES PATENTS

| | | | |
|---|---|---|---|
| 2,847,472 | 8/1958 | Robertson | 260—566 |
| 2,847,473 | 8/1958 | Robertson | 260—566 |
| 3,250,798 | 5/1966 | Shulgin | 260—465 |

ALBERT T. MEYERS, Primary Examiner

D. J. FUNDERBURK, Assistant Examiner

U.S. Cl. X.R.

424—309, 310, 311, 330; 260—465, 471, 566